(12) United States Patent
Paulino et al.

(10) Patent No.: US 7,748,956 B2
(45) Date of Patent: Jul. 6, 2010

(54) NON-STABLUG STATOR APPARATUS AND ASSEMBLY METHOD

(75) Inventors: Jose Paulino, Saco, ME (US); Mark Rogers, Kennebunkport, ME (US); Charles H. Warner, South Portland, ME (US); Steven D. Jenkel, Springvale, ME (US); Kurt R. Heinemann, Waterboro, ME (US); Steven R. Chabot, Saco, ME (US); Chester D. Blackman, Jr., Kennebunk, ME (US); Paul S. Bean, Jr., Wells, ME (US)

(73) Assignee: United Technologies Corporation, Hartford, CT (US)

( * ) Notice: Subject to any disclaimer, the term of this patent is extended or adjusted under 35 U.S.C. 154(b) by 849 days.

(21) Appl. No.: 11/641,349

(22) Filed: Dec. 19, 2006

(65) Prior Publication Data

US 2008/0141531 A1 Jun. 19, 2008

(51) Int. Cl.
*F01D 9/02* (2006.01)
(52) U.S. Cl. .................... 415/209.4; 416/213 R; 29/889.22
(58) Field of Classification Search ............. 415/209.3, 415/209.4; 416/213 R; 29/889.22
See application file for complete search history.

(56) References Cited

U.S. PATENT DOCUMENTS

| | | | | |
|---|---|---|---|---|
| 3,313,520 A | * | 4/1967 | Ortolano et al. | 415/209.4 |
| 3,436,515 A | * | 4/1969 | Sayer et al. | 219/121.14 |
| 3,975,612 A | * | 8/1976 | Nakazaki et al. | 219/121.14 |
| 3,999,030 A | * | 12/1976 | Nakazaki et al. | 219/121.14 |
| 3,999,031 A | * | 12/1976 | Yonezawa et al. | 219/121.14 |
| 4,288,677 A | * | 9/1981 | Sakata et al. | 219/121.14 |
| 4,509,238 A | | 4/1985 | Lee et al. | |
| 4,767,267 A | * | 8/1988 | Salt et al. | 415/173.7 |
| 5,174,715 A | | 12/1992 | Martin | |
| 5,474,419 A | | 12/1995 | Reluzco et al. | |
| 6,119,339 A | | 9/2000 | Richter et al. | |
| 6,343,912 B1 | * | 2/2002 | Manteiga et al. | 415/138 |
| 6,543,998 B1 | | 4/2003 | Scharl | |

FOREIGN PATENT DOCUMENTS

| | | | |
|---|---|---|---|
| FR | 2278910 A | * | 3/1976 |
| GB | 2 132 512 A | | 7/1984 |
| JP | 53067004 A | * | 6/1978 |

(Continued)

OTHER PUBLICATIONS

English Translation of JP 60-166181 A. USPTO Translation Branch. Irina Knizhnik. Jan. 4, 2010.*

(Continued)

*Primary Examiner*—Richard Edgar
(74) *Attorney, Agent, or Firm*—Kinny & Lange, P.A.

(57) ABSTRACT

A method of assembling a stator apparatus includes providing a first vane having an airfoil section located between a first platform section and a second platform section, positioning a first shroud ring adjacent to the first vane, welding the first platform section of the first vane to the first shroud ring relative to a first edge of the of the first platform section of the first vane, and welding the first platform section of the first vane to the first shroud ring relative to a second edge of the of the first platform section. The second edge is located opposite the first edge.

15 Claims, 6 Drawing Sheets

FOREIGN PATENT DOCUMENTS

| | | | |
|---|---|---|---|
| JP | 56032006 A | | 4/1981 |
| JP | 58150005 A | * | 9/1983 |
| JP | 59039906 A | * | 3/1984 |
| JP | 59065501 A | * | 4/1984 |
| JP | 60166181 A | * | 8/1985 |
| JP | 63266103 A | * | 11/1988 |
| JP | 9053410 A | | 2/1997 |
| WO | WO2006100256 A1 | | 9/2006 |

OTHER PUBLICATIONS

English Translation of JP 53-067004 A. The McElroy Translation Company. Washington D.C. Dec. 2009.*

Official Search Report and Written Opinion of the European Patent Office in counterpart foreign Application No. 07254781.3, filed Dec. 11, 2007.

* cited by examiner

NON-STABLUG STATOR APPARATUS AND ASSEMBLY METHOD

BACKGROUND OF THE INVENTION

The present invention relates to an airfoil apparatus for gas turbine engines and a method for fabricating such an apparatus.

Gas turbine engines typically include a number of airfoil structures that interact with fluids that pass through the engine. Some of those airfoil structures comprise portions of non-rotating stator (or vane) structures. Stator structures are often made from forged components that are installed between a pair of shroud (or casing) rings through brazed connections. Brazing is a convenient and effective technique for joining airfoils to shroud rings to fabricate the stator structure. However, brazing can form a relatively low-strength joint that may not withstand relatively high stresses at or near the braze location. In essence, brazing can produce joints that are not as strong as the forged material of the stator structure. In order to compensate for the lower mechanical properties of brazed connections, stablugs have been added to stator structures. Stablugs are thickened portions of the stator structure that help keep braze materials away from the airfoil, which is thin and typically experiences relatively high stresses during engine operation. Stablugs can take a variety of cross-sectional shapes, including "racetrack" shapes (i.e., having linear side portions and rounded end portions that generally do not match that of the stator structure) as well as "airfoil" shapes that generally correspond to the aerodynamic contour of the airfoil. Regardless of the cross-sectional shape, the stablug must extend into the main gas flowpath of the engine adjacent to the airfoil. For example, the stablug may radially extend 0.127 cm (0.050 inch) proud into the gas flowpath for any given stator, which for low aspect ratio airfoils used in new engine designs can be over 9% of the span of the airfoil into the gas flowpath.

The relatively thick stablugs that extend into the gas flowpath of the engine have an undesirable impact on engine performance and efficiency (e.g., measured in terms of pressure loss), especially with stators for which it is desired to have a relatively small span. The stablugs create flow blockage at the endwalls of the stator structure in the gas flowpath. Moreover, the presence of a stablug precludes the inclusion of any stator features at that location, which is at the outer diameter or inner diameter of the airfoil where the stator is attached to the shroud rings. However, other known possibilities present cost, reliability and assembly problems. For instance, simply omitting the stablug can cause the braze joint to incur higher stresses during engine operation. Some stablugs can be partially recessed (though not entirely recessed), but recessing the stablug cannot be accomplished with high solidity stator assemblies (i.e., those with low aspect ratios and high vane counts) and does not completely eliminate the inefficiencies associated with stablug use.

BRIEF SUMMARY OF THE INVENTION

A method of assembling a stator apparatus includes providing a first vane having an airfoil section located between a first platform section and a second platform section, positioning a first shroud ring adjacent to the first vane, welding the first platform section of the first vane to the first shroud ring relative to a first edge of the of the first platform section of the first vane, and welding the first platform section of the first vane to the first shroud ring relative to a second edge of the of the first platform section. The second edge is located opposite the first edge.

DETAILED DESCRIPTION

Figure 1:
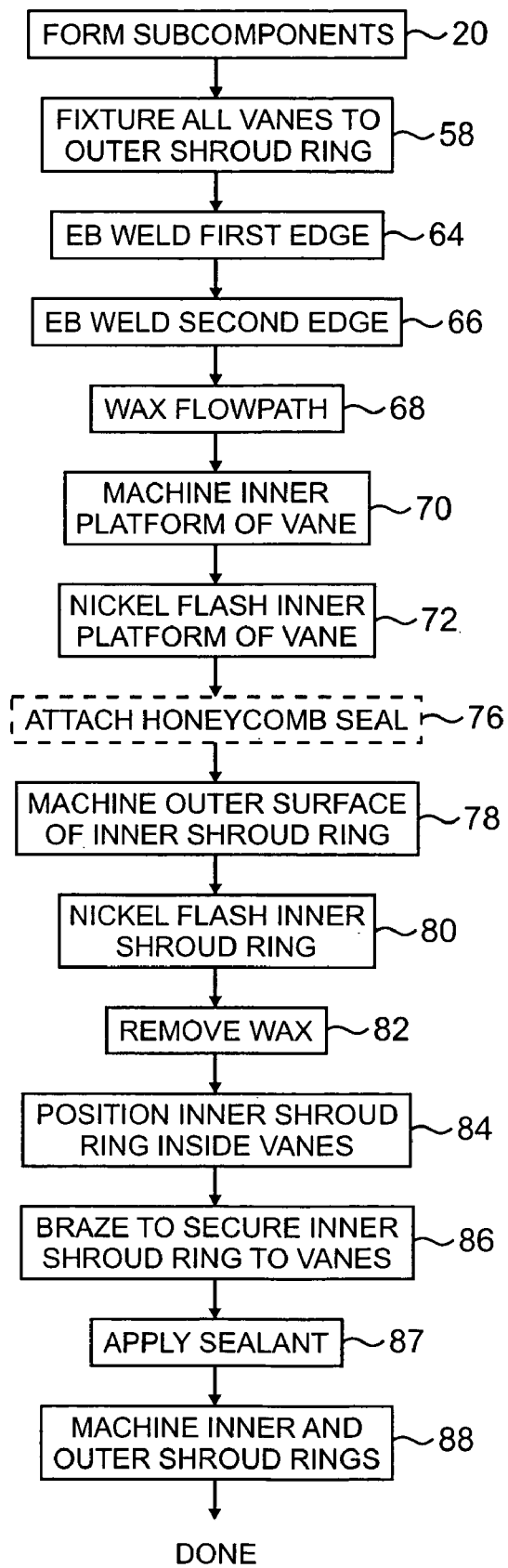
FIG. 1 is a flow chart of a stator apparatus assembly method according to the present invention.

FIG. 1 is a flow chart of a stator apparatus assembly method, which is suitable for fabricating a high pressure compressor (HPC) stator nozzle or other similar flowpath structures for a gas turbine engine. The steps illustrated in FIG. 1 are described with reference to physical structures shown in FIGS. 2-6. However, it should be recognized that the methods of the present invention are applicable to structures that are different from the embodiments illustrated in FIGS. 2-6.

As shown in FIG. 1, an initial step of the assembly method involves forming subcomponents of the apparatus (step 20). The subcomponents can be formed using milling, precision forging, turning and/or other known processes as desired for particular applications. The step of forming the subcomponents (step 20) can provide at least some desired final material properties.

Figure 2:
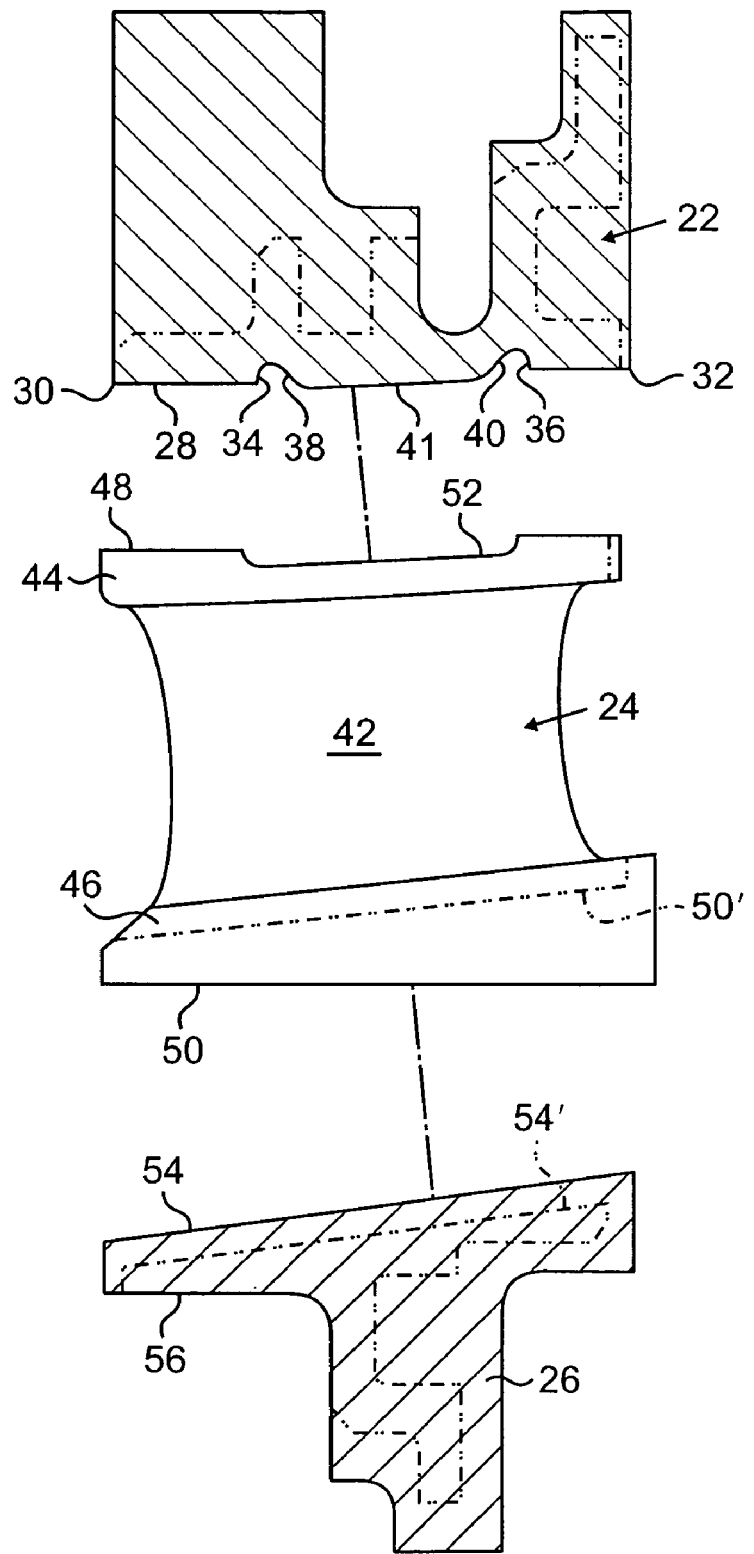
FIG. 2 is an exploded cross-sectional view of a stator apparatus according to the present invention prior to assembly.

FIG. 2 is an exploded cross-sectional view of a stator apparatus prior to assembly, showing an outer shroud (or casing) ring 22, a vane structure 24, and an inner shroud (or casing) ring 26. The vane structure 24 and the two shroud rings 22 and 26 are shown in FIG. 2 in their preliminary configurations after forming (step 20), although final shapes of those subcomponents can differ from the preliminary configurations. For example, possible final shapes of the subcomponents are indicated in phantom in FIG. 2 for reference.

As shown in FIG. 2, the outer shroud ring 22 includes a radially inner surface 28 (or inner diameter surface) that defines a forward edge 30 and an aft edge 32. A forward groove 34 and an aft groove 36 are formed along the radially inner surface 28 in a generally circumferential orientation. A forward weld backstrike surface 38 and an aft weld backstrike surface 40 are formed along the forward and aft grooves 34 and 36, respectively, and each weld backstrike surface 38 and 40 extends radially inward from adjacent portions of the inner surface 28. A raised portion 41 extends between the weld backstrike surfaces 38 and 40 along the inner surface 28. The functions of the weld backstrike surfaces 38 and 40 and the grooves 34 and 36 are explained in greater detail below.

The vane structure 24 includes an airfoil 42, an outer platform 44 and an inner platform 46. The outer and inner platforms 44 and 46 are generally annular structures that define portions of a gas flowpath for an engine. The airfoil 42 extends between the outer and inner platforms 44 and 46. The outer platform 44 defines an outer surface 48 and the inner platform 46 defines a preliminary inner surface 50. A circumferential groove 52 is formed in the outer surface 48 of the outer platform 44. In a preferred embodiment, the vane structure 24 is formed unitarily, although it is possible in alternative embodiments for portions of the vane structure 24 to be non-unitary and attached by suitable means.

The inner shroud ring 26 defines a preliminary radially outer surface 54 (or outer diameter surface) and an inward facing region 56.

Turning again to the flow chart of FIG. 1, the next step is to fixture all vanes 24 to the outer shroud ring 22 (step 58). Typically a plurality of circumferentially adjacent vane structures 24 are used to form an annular stator assembly for a gas turbine engine. At step 58, all of the vane structures 24 are positioned adjacent to each other within the outer shroud ring 22 and secured in place using appropriate fixtures.

Figure 3:
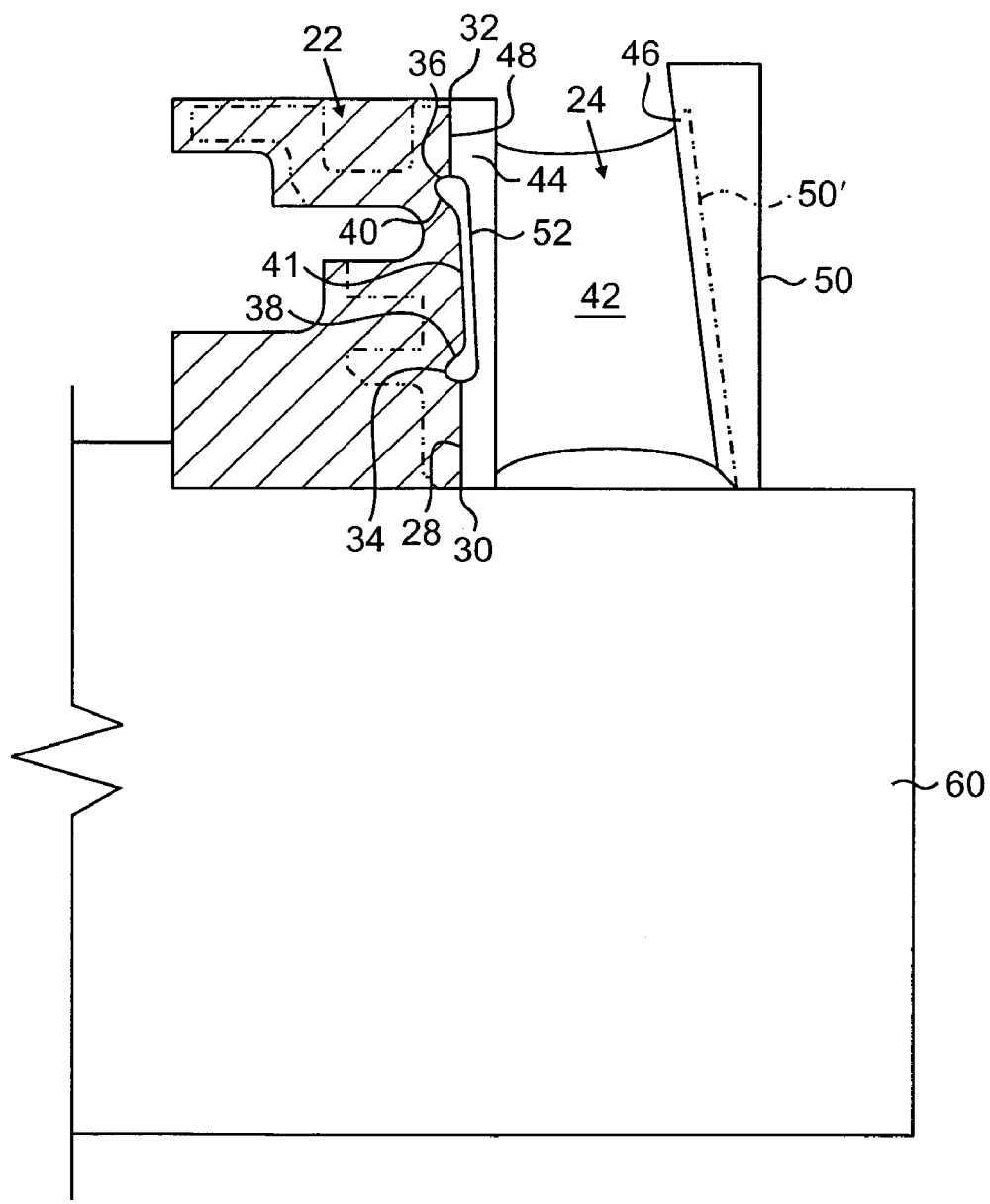
FIGS. 3 and 4 are cross sectional views of the stator apparatus at different points during assembly.

FIG. 3 is a cross sectional view of the vane structure 24 fixtured to the outer shroud ring 22 by an exemplary fixture 60. Once fixtured, the vane structure 24 and the outer shroud ring 22 are welded together. Welding can be performed using conventional electron beam (EB) welding techniques. A first weld is formed at the aft edge 32 of the outer shroud ring 22 (step 64), and then a second weld is formed at the forward edge 30 of the outer shroud ring 22 (step 66) after the components are repositioned on the fixture 60. The first weld extends along the interface between the inner surface 28 of the outer shroud ring 22 and the outer surface 48 of the outer platform 44 of the vane structure 24, and extends from the aft edge 32 to the groove 36. Likewise, the second weld extends along the interface between the inner surface 28 of the outer shroud ring 22 and the outer surface 48 of the outer platform 44 of the vane structure 24, and extends from the forward edge 30 to the groove 34.

The EB weld beam penetrates the areas of the first and second welds to the cavity formed by the grooves 34,36 and 52, which are configured such that first and second welds do not bridge the grooves 34 and 36. The weld backstrike surfaces 38 and 40 and the raised portion 41 of the outer shroud ring 22 are configured to help separate the first and second welds, and to limit deeper progress of the EB weld beam. This arrangement helps prevent the EB weld beam from stopping within the joint regions where the first and second welds are formed, which would be undesirable for weld integrity. The first and second welds can be formed by fixing the EB weld beam and rotating the components being welded such that welding is performed in a circumferential manner relative to substantially the entire inner diameter of the outer shroud ring 22.

Next, wax is applied to the flowpath, that is, wax is applied between the airfoils 42 of adjacent vane structures 24 welded to the outer shroud ring 22 (step 68). Tape can be applied at flowpath joints between adjacent vane structures 24 prior to applying the wax, in order to help contain the wax. The wax gives the airfoils 42 additional rigidity during subsequent assembly processes.

Once wax has been applied at step 68, the inner platform 46 of the vane structure 24 is machined to a final dimension (step 70).

Material is removed at the preliminary inner surface 50 of the inner platform 46 to form a finished inner surface 50'. Then the finished inner surface 50' of the inner platform 46 is nickel flashed (i.e., nickel plated) to prepare it for brazing (step 72).

At this point, a honeycomb seal 74 can optionally be attached to the inward facing region 56 of the inner shroud ring 26 (step 76) (e.g., using a nickel braze). Next, the inner shroud ring 26 is machined to remove material from the preliminary outer surface 54 and define a finished outer surface 54' (step 78). Then the finished outer surface 54' of the inner shroud ring 26 is nickel flashed (i.e., nickel plated) to prepare it for brazing (step 80). Following nickel plating (step 80), the wax (and any tape) is removed from the flowpath (step 82), which can be accomplished by heating the wax to melt it away. The optional honeycomb seal 74 can be masked while performing nickel plating and/or brazing processes.

Next, the inner shroud ring 26 is slid into position inside the vane structures (step 84). Step 84 may require heating radially outer components (e.g., the vane structures) and/or cooling radially inner components (e.g., the inner shroud ring) in order to slide the inner shroud ring 26 into position while providing a close fit and easing assembly. Gaps between the inner shroud ring 26 and the vane structures 24 can be verified prior to brazing to assure proper fit. In order to facilitate later assembly steps, a braze foil can be tack welded to the finished outer surface 54' of the inner shroud ring 26 when the ring 26 is slid into position inside the vane structures 24.

Figure 4:
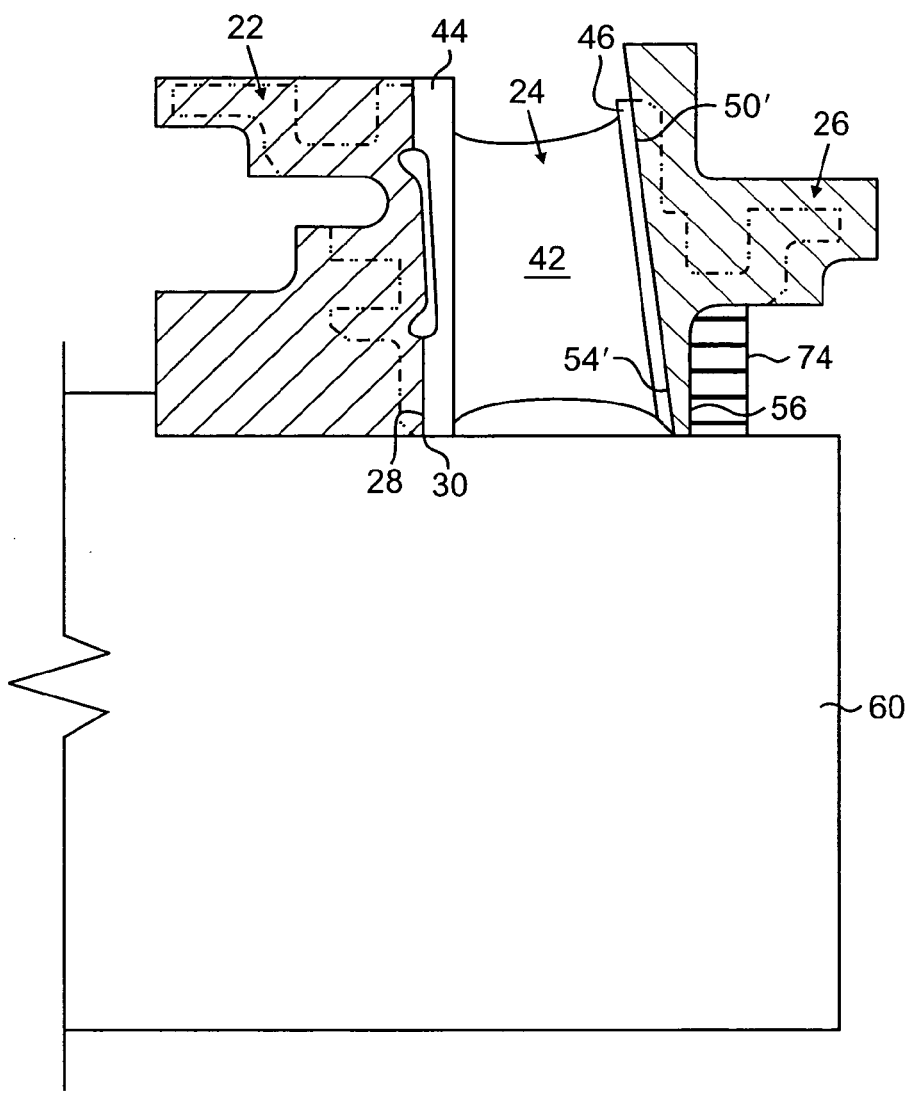

FIG. 4 is a cross sectional view of the stator apparatus fixtured to the fixture 60 following assembly step 84. The next assembly step is to braze (e.g., using a gold-nickel braze material) the inner shroud ring 26 to the vane structure 24 in order to secure those components to each other (step 86). The brazing process can be conducted in a conventional manner along substantially the entire interface between the finished outer surface 54' of the inner shroud ring 26 and the finished inner surface 50' of the inner platform 46 of the vane structure 24. Brazing is performed circumferentially to secure all of the vane structures 24 to the inner shroud ring 26. Brazing can be performed with the forward edge 30 facing downward in the fixture 60.

After the inner shroud ring 26 has been secured to the vane structure 24 (step 86), sealant is applied to any circumferential gaps between adjacent vane structures 24 (step 87). The sealant helps to reduce undesired leakage and flow recirculation, and generally forms a non-structural bond between the adjacent vane structures 24 The sealant can be a ceramic cement, a metallic braze, a high-temperature epoxy sealant, or other suitable material.

Next, the outer and inner shroud rings 22 and 26 are machined to desired finished dimensions (step 88). At this step, the optional honeycomb seal 74 can also be ground to finished dimensions. Any further finishing steps can also be performed at this step, as desired for particular applications. For example, a timing notch can be formed in the inner shroud ring 26 through milling or electric discharge machining (EDM). Moreover, the shroud rings 22 and 26 can be optimally segmented as desired.

Figure 5:
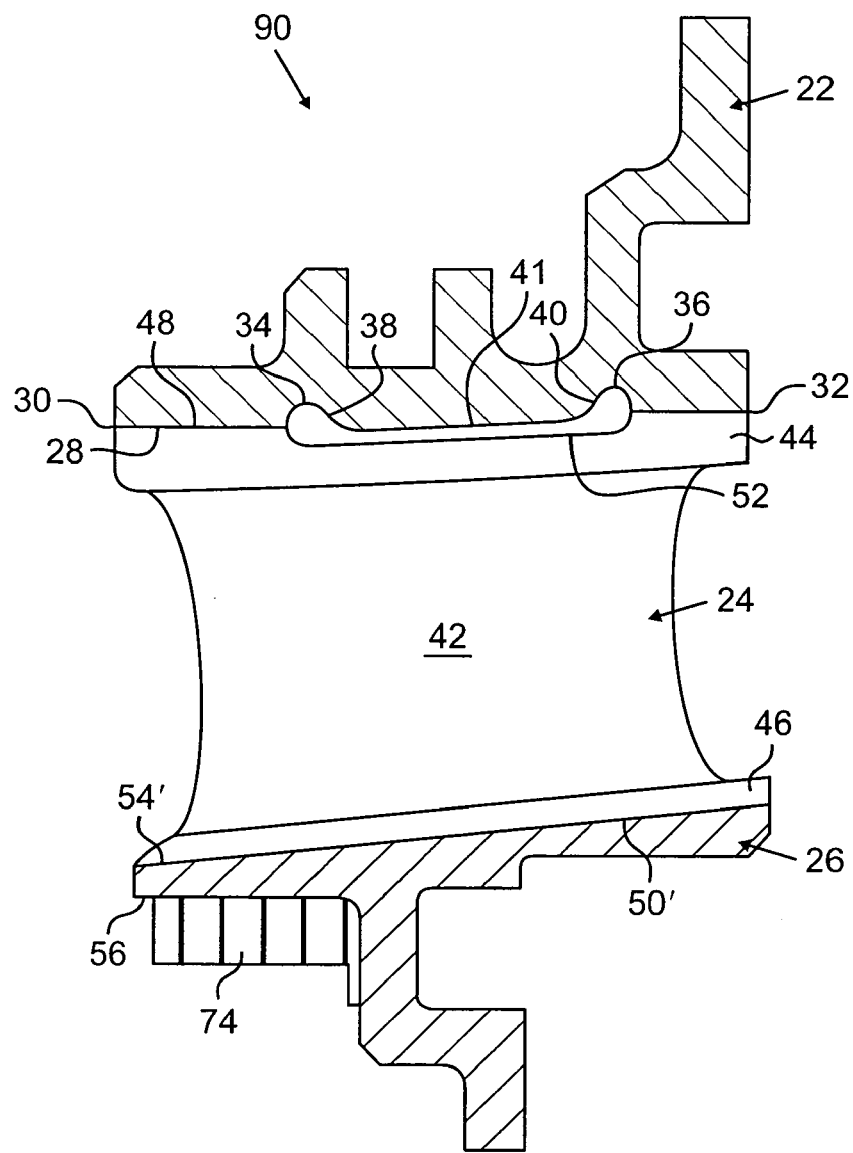
FIG. 5 is a cross-sectional view of the stator apparatus when fully assembled.
Figure 6:
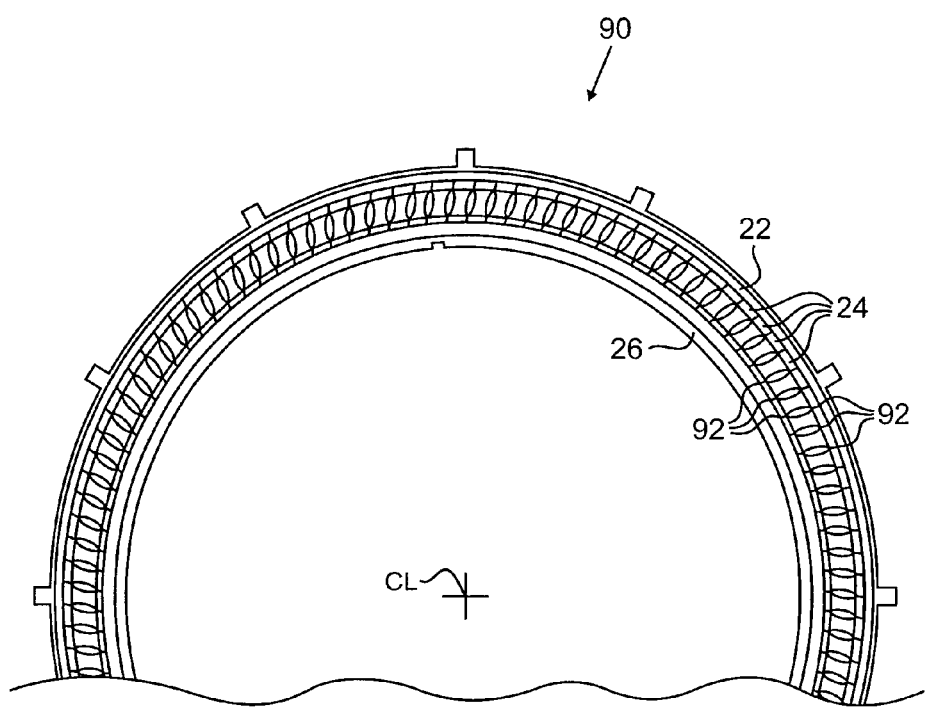
FIG. 6 is a front view of a portion of the stator apparatus when fully assembled.

FIGS. 5 and 6 illustrate a fully assembled stator apparatus 90.

FIG. 5 is a cross-sectional view and FIG. 6 is a front view of a portion of the stator apparatus 90. As shown in FIG. 6, a plurality of vane structures 24 (e.g., 100 or more vane structures) are arranged adjacent to each other in an annular configuration relative to an engine centerline CL between the outer shroud ring 22 and the inner shroud ring 26. A sealant 92 is illustrated between adjacent vane structures 24 at both outer and inner platform 44 and 46 locations.

It should be recognized that the apparatus and method of the present invention provide a number of advantages. For example, a stator apparatus according to the present invention avoid the need for a stablug. Stablugs have been determined to cause a 1% loss in pressure over a non-stablug design according to the present invention for some applications, although total pressure loss will vary with the span of the airfoils of the stator apparatus and will generally be greater with relatively small span dimensions. Furthermore, the present invention provides a relatively easy and reliable assembly method that does not degrade forged material properties in the airfoils during welding or brazing processes. Subcomponents can be forged, and the assembly method can preserve forged properties.

Although the present invention has been described with reference to preferred embodiments, workers skilled in the art will recognize that changes may be made in form and detail without departing from the spirit and scope of the invention. The particular shape and configuration of the stator assembly can vary as desired for particular applications, for instance, the present invention applies to cantilevered stators secured only at either an outer or inner shroud ring. Moreover, the particular assembly steps involved and the order in which those steps are performed can also vary as desired for particular applications. For instance, welding can be used at the outer shroud ring and brazing at the inner shroud ring or vice-versa.

What is claimed is:

1. A method of assembling a stator apparatus, the method comprising:
   providing a first vane having an airfoil section located between a first platform section and a second platform section;
   positioning a first shroud ring adjacent to the first vane;
   welding the first platform section of the first vane to the first shroud ring relative to a first edge of the of the first platform section of the first vane to create a first weld;
   welding the first platform section of the first vane to the first shroud ring relative to a second edge of the first platform section to create a second weld, wherein the second edge is located opposite the first edge, wherein the first shroud ring is welded to the second edge of the first platform section of the first vane using electron beam welding;
   passing an electron beam used for electron beam welding from the second weld to a groove in the first shroud ring located adjacent to the second weld; and
   limiting progress of an electron beam with a weld backstrike surface on the first shroud ring, wherein the weld backstrike surface is located along a cavity formed by the groove in the first shroud ring and opposite the second weld, and wherein the weld backstrike surface is spaced, across at least a portion of the cavity formed by the groove in the first shroud ring, from the second weld such that the second weld does not bridge the cavity formed by the groove.

2. The method of claim 1, wherein the first edge of the first platform section comprises an aft edge.

3. The method of claim 1, wherein the airfoil section, the first platform section and the second platform section of the first vane are formed integrally.

4. The method of claim 1 and, prior to the step of welding the first platform section of the first vane to the first shroud ring, further comprising the steps of:
   providing a second vane having an airfoil section located between a first platform section and a second platform section; and
   positioning the second vane adjacent to both the first shroud ring and the first vane.

5. The method of claim 4 and further comprising the step of:
   welding the first platform section of the second vane to the first shroud ring relative to a first edge of the first platform section of the second vane.

6. The method of claim 1 and further comprising:
   positioning a second shroud ring adjacent to the first vane; and
   brazing the second platform section of the first vane to the second shroud ring.

7. The method of claim 6 and further comprising the step of:
   machining the second platform section of the first vane prior to positioning a second shroud ring adjacent to the first vane.

8. The method of claim 6 and further comprising the step of:
   machining the first and second shroud rings.

9. A product obtained by a process comprising:
   positioning a first shroud ring adjacent to a first vane having an airfoil section located between a first platform section and a second platform section;
   welding the first platform section of the first vane to the first shroud ring relative to a first edge of the of the first platform section of the first vane to create a first weld;
   welding the first platform section of the first vane to the first shroud ring relative to a second edge of the of the first platform section with an electron beam, wherein the second edge is located opposite the first edge to create a second weld;
   passing an electron beam used for electron beam welding from the second weld to a groove in the first shroud ring located adjacent to the second weld;
   limiting progress of the electron beam with a weld backstrike surface on the first shroud ring, wherein the weld backstrike surface is located along a cavity formed by the groove in the first shroud ring and opposite the second weld, and wherein the weld backstrike surface is spaced across at least a portion of the cavity formed by the groove in the first shroud ring from the second weld such that the second weld does not bridge the cavity formed by the groove;
   positioning a second shroud ring adjacent to the first vane; and
   brazing the second platform section of the first vane to the second shroud ring.

10. An apparatus for use with a gas turbine engine, the apparatus comprising:
    a first vane having an airfoil section integrally formed between a first platform section and a second platform section;
    a first shroud ring attached to the first platform section of the first vane by welding, wherein the first shroud ring is welded to the first platform section of the first vane at both a first weld location and a second weld location, wherein the first and second weld locations are physically separate, and wherein the first shroud ring comprises:
       first and second grooves, wherein the first and second grooves at least partially define a cavity between the first platform section of the first vane and the first shroud ring;
       a raised portion positioned in between the first and second grooves; and
       first and second weld backstrike surfaces each located between the first and second weld locations, wherein the first and second weld backstrike surfaces are each located along the cavity at opposite sides of the raised portion and spaced from the first and second weld locations; and
    a second shroud ring attached to the second platform section of the first vane.

11. The apparatus of claim 10, wherein the airfoil section of the first vane does not include an enlarged portion adjacent to either the first or second platform section.

12. The apparatus of claim 10, wherein the first weld location is located relative to a first edge of the first platform section of the first vane and the second weld location is located relative to a second edge of the first platform section of the first vane, and wherein the first and second edges of the first platform section are located opposite each other.

13. The apparatus of claim 10, wherein the second shroud ring is brazed to the second platform section of the first vane.

14. The apparatus of claim 10 and further comprising:
a second vane attached between the first and second shroud rings and adjacent to the first vane.

15. The apparatus of claim 14 and further comprising:
a sealant applied to a circumferential gap between the first vane and the second vane.

* * * * *